United States Patent [19]

Bialek

[11] 3,841,428
[45] Oct. 15, 1974

[54] AUXILIARY ELECTRIC DRIVE ATTACHMENT FOR A VEHICLE

[76] Inventor: Norman Bialek, 14 Broadview Rd., Westport, Conn. 06880

[22] Filed: Dec. 20, 1971

[21] Appl. No.: 209,519

[52] U.S. Cl. .................................. 180/74, 180/31
[51] Int. Cl. ............................................ B62d 3/00
[58] Field of Search .................. 180/31, 34, 74, 65; 310/112, 118, 120; 198/203; 318/45

[56] References Cited
UNITED STATES PATENTS

| | | | |
|---|---|---|---|
| 1,511,341 | 10/1924 | James | 318/45 X |
| 2,749,494 | 6/1956 | Bosco | 318/45 |
| 2,751,991 | 6/1956 | Mennesson | 180/31 |
| 3,056,460 | 10/1962 | Hanson | 180/31 |
| 3,407,680 | 10/1968 | Westmoreland | 310/118 |
| 3,431,994 | 3/1969 | Wood | 180/74 |
| 3,439,926 | 4/1969 | Bayard | 180/74 |

Primary Examiner—Robert G. Sheridan
Assistant Examiner—John Mannix
Attorney, Agent, or Firm—H. Gibner Lehmann; K. Gibner Lehmann

[57] ABSTRACT

An electric power drive attachment for a wheeled vehicle, as for instance a bicycle, comprising a pair of separate and distinct electric motors mounted adjacent one wheel of the bicycle, the motors being disposed end-to-end and having their shafts in axial alignment. A resilient rubber coupling, having sockets in its ends, receives the shafts and interconnects them for simultaneous turning. The coupling includes a drive roller which engages the bicycle wheel to be driven. A rechargeable battery provides a source of power to drive the motors. The motors preferably have permanent magnet fields and thus can advantageously generate a current when uniquely connected and mechanically driven by the bicycle wheel. Switch means are included to effect connection of the motors in parallel across the battery to drive the bicycle. Provision is also made for connecting the motors in series-aiding relation across the battery to provide efficient charging of the same when the motors are mechanically driven. Alternately, the motors when driven can be connected to a load resistor and thus provide auxiliary electric braking for the bicycle, if necessary. A lever located on the handle bars permits selective engagement and disengagement of the drive roller and the bicycle wheel, to permit the bicycle having the drive attachment to be operated in the conventional manner.

13 Claims, 7 Drawing Figures

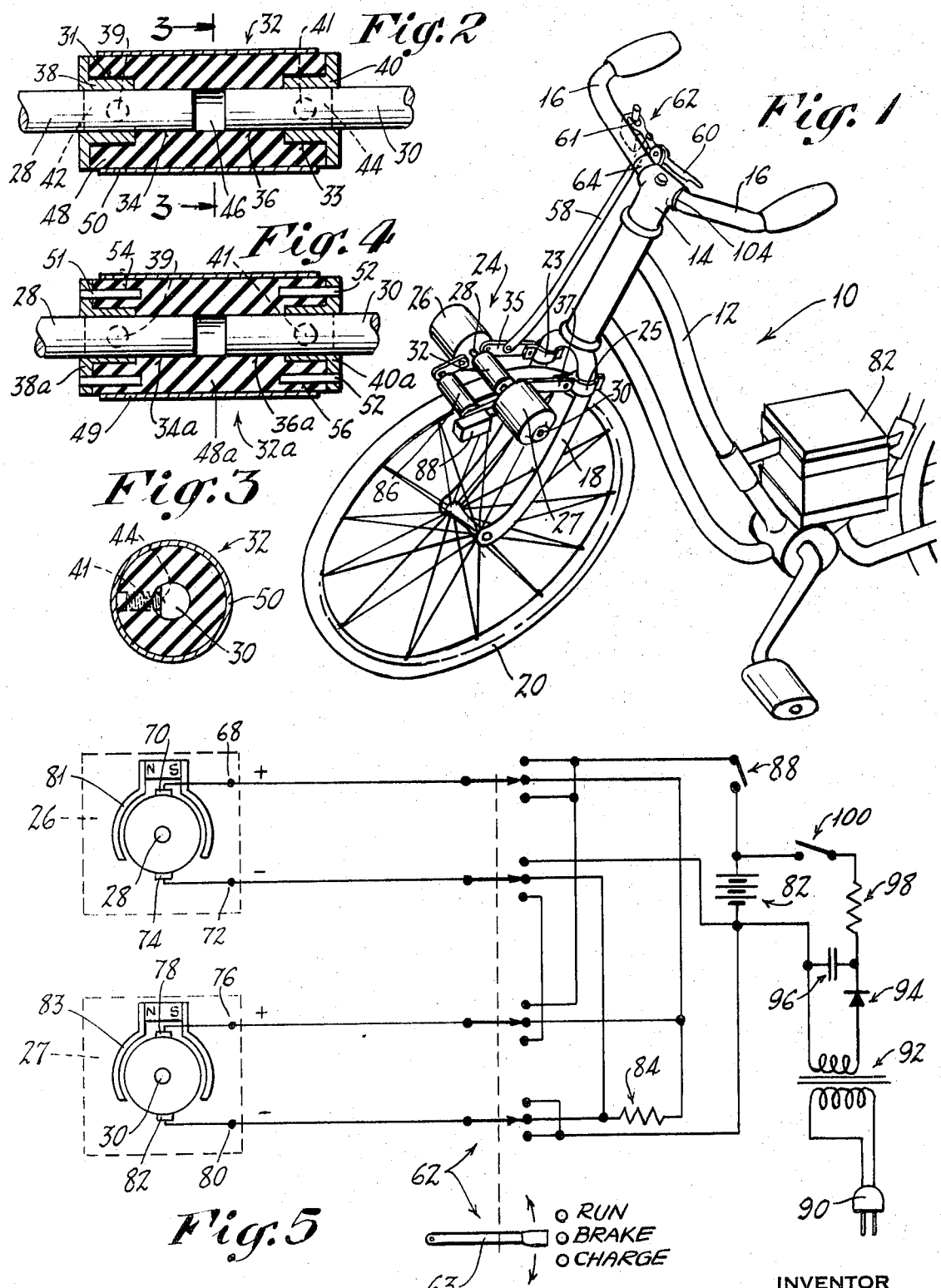

3,841,428

PATENTED OCT 15 1974

INVENTOR
Norman Bialek
BY
H. Gibner Lehmann
AGENT

AUXILIARY ELECTRIC DRIVE ATTACHMENT FOR A VEHICLE

BACKGROUND

This invention relates to power drive devices for propelling wheeled vehicles such as bicycles and the like, and more particularly to devices wherein the drive mechanism frictionally engages one wheel of a vehicle or bicycle to impart power thereto. A number of bicycle drive systems have been proposed and constructed in the past. Several of these have employed internal combustion engines to drive friction rollers engaging either the front or the rear wheel of the cycle. Somewhat more elaborate schemes have involved the use of internal combustion engines in conjunction with transmissions of various types to enable the bicycle to be driven at a number of different speeds.

Electric motors driven from battery power have also been employed in power drive apparatus for bicycles. Where a single motor was large enough to provide adequate power for effectively driving the bicycle, it proved to be too bulky and heavy, and the mounting of such a motor in a position where it would not upset the balance of the bicycle presented a problem. In other cases, a number of smaller motors was employed, these being geared together with rather complex (and often inefficient) gear trains which transferred the power therefrom to a friction drive wheel and hence to the large bicycle wheel. In many cases, the modification to an existing bicycle in order to adapt it for power drive capability was fairly extensive, and thus the usefulness and simplicity of the bicycle in the conventional, non-powered mode was often sacrified. Finally, in most cases, battery powered vehicles suffered from the gradual discharge of the battery during prolonged use, and had no provision for recharging the exhausted battery other than connecting it to a charger device which had to be operated from commercial power mains. Such a condition requiring recharge of the battery imposed a limitation on the usefulness of the power drive device, since the charger device and power mains were not always conveniently at hand, when the battery become discharged.

SUMMARY

The above drawbacks and disadvantages of prior power drive arrangements for bicycles and other vehicles are obviated by the present invention which has for its main object the provision of a novel and improved multi-motored, balanced battery-powered vehicle power drive attachment which is especially simple in its construction and highly efficient; and an attachment as thus characterized, which is reliable in operation and which does not significantly impair the usefulness of the vehicle as a conventional non-electric-powered vehicle. Another important object of the invention is to provide a novel electric power attachment for vehicles such as bicycles, which will efficiently restore a charge to the battery when the bicycle in coasting downhill, to thereby enable use of the attachment over a substantially longer period of time than would otherwise be possible without the use of external charging apparatus.

Still another object of the present invention is to provide an improved electric drive attachment as above set forth, which provides safety to the operator by automatically rendering inoperative the drive motors in the event the bicycle exceeds a predetermined speed; an attachment which can provide manually operable, selective auxiliary electric braking to the bicycle to supplement the conventional braking means.

The above objects are accomplished by the provision of a pair of separate and distinct electric motors disposed end to end, adjacent one wheel of the vehicle or bicycle and having their shafts in axial alignment. A resilient coupling, provided with sockets in its ends, receives the respective shafts and interconnects them for simultaneous turning movement and for imparting power to a friction drive roller which is drivingly engageable with one wheel of the bicycle. Each of the motor shafts preferably carries a collar, engaging an end portion of the coupling to thereby position the same and to prevent axial movement thereof with respect to the shafts. The motors are preferably of the type having a permanent magnet field, and thus are capable of generating an electric current when mechanically driven. The motors are powered by a battery which is preferably of the rechargeable type. Switch means are included to permit connection of the motors in parallel across the battery for the driving power. Alternately, the switch means permit connection of the motors in series-aiding relation across the battery, advantageously to provide a charging current thereto when the motors are mechanically driven at high speed (as when the bicycle is coasting downhill). Another function of the switch means is to connect the motors across a load resistor, which will provide auxiliary electric braking for the bicycle when the motors are mechanically driven by the wheel. In addition, manually operable means are provided for selective engagement and disengagement of the friction drive roller from the driven wheel of the bicycle to permit the same to be employed as a non-powered vehicle in the conventional manner.

Objects and advantages will hereinafter appear.

FIG. 1 is a perspective view of a conventional bicycle, having incorporated the power drive attachment of the present invention.

FIG. 2 is a longitudinal sectional view of one type of coupling which may be employed to interconnect the two motor shafts.

FIG. 3 is a transverse section taken on the line 3—3 of FIG. 2.

FIG. 4 is a longitudinal sectional view of another type of coupling for interconnecting the two motor shafts.

FIG. 5 is a schematic circuit diagram of the power drive attachment of the present invention.

Figure 6:
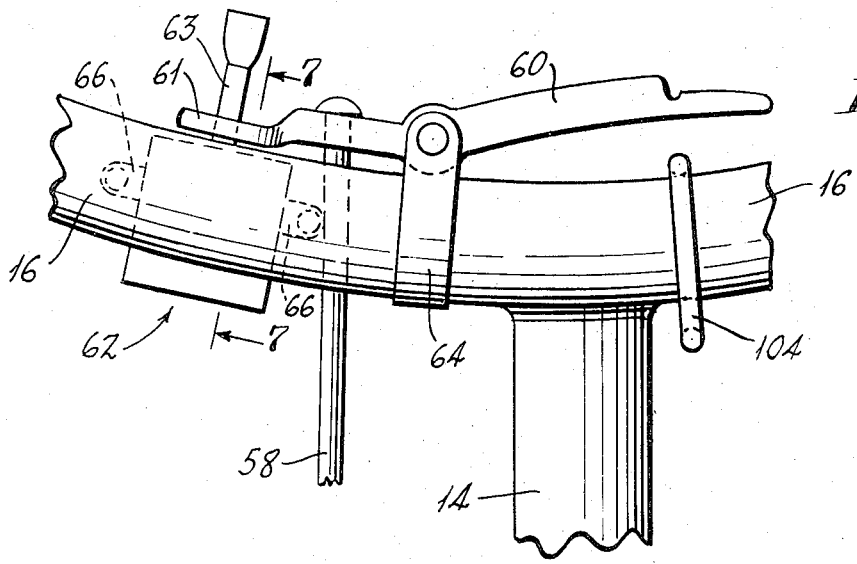
FIG. 6 is a front elevational view of the manually operable means and switch means mounted on the handle bars.

Referring first to FIG. 1, there is illustrated a bicycle generally designated by the numeral 10, including a frame 12, handle bar post 14 rotatably mounted on the frame, handle bars 16 and fork 18 rigidly mounted to and rotatable with the handle bar post 14. The front wheel 20 is rotatably carried by the fork 18.

In accordance with the present invention there is illustrated a power drive attachment generally designated by the numeral 24, and comprising a pair of separate and distinct electric motors 26 and 27, located adjacent the front wheel 20 and disposed end-to-end, having their shafts 28 and 30 respectively in axial alignment. Brackets 23, 25 are fastened respectively to the upper portions of the bicycle fork 18, and arms 35 and 37 are pivotally mounted respectively on the brackets 23, 25 by means of pivot pins. The arms 35 and 37 are rigidly fastened to the motors 26 and 27 respectively, and thus enable pivotal movement of the motors with respect to the fork 18 and wheel 20.

In accordance with the present invention there is further provided a resilient means for interconnecting the motor shafts 28 and 30 for simultaneous turning with a minimum of binding, said means comprising a coupling 32 having a rubber body or drive roller 48 provided with sockets 34 and 36 in its ends to frictionally receive the motor shafts 28 and 30 respectively, as best illustrated in FIG. 2. Collars 38 and 40 carried by the motor shafts 28 and 30 respectively are fastened thereto by set screws 39 and 41 and engage the end portions of the coupling 32 to provide axial positioning of the latter with respect to the shafts. The shafts can optionally be provided with flatted portions 42 and 44 respectively as shown in FIGS. 2 and 3. In such a case, the coupling 32 can have a longitudinal bore 46 communicating with the sockets 34 and 36, the cross section of the bore 46 being essentially D-shaped, and thus providing a means keyed to the flatted portions 42 and 44 of the shafts 28 and 30 respectively to thereby prevent slippage between the coupling 32 and the shafts. The collars 38 and 40 can also have knurled surfaces 31 and 33 to frictionally grip the adjacent portions of the coupling 32. The outer portion of the rubber coupling 32 is substantially cylindrical in shape and has a cylindrical jacket 50, preferably of metal, which fits snugly around the outer portion of the rubber coupling 32 and is also axially positioned by the collars 38 and 40 since the jacket slightly comprises the rubber by a few thousandths of an inch and has an inner diameter slightly smaller than the outer diameters of the collars. The jacket 50 is adapted to frictionally and drivingly engage the front wheel 20 of the bicycle, thus constituting a friction drive roller, which has power imparted thereto by the resilient means or coupling interconnecting the motor shafts 28 and 30.

Another embodiment of the invention is illustrated in FIG. 4, wherein the resilient means interconnecting the motorsshafts 28 and 30 comprises a coupling 32a having a rubber body 48a provided with sockets 34a and 36a in its ends to frictionally receive the motor shafts 28 and 30. A pair of collars 38a and 40a is carried by the motor shafts 28 and 30 respectively, being fastened thereto by set screws 39 and 41. The collars 38a and 40a engage the end portions of the coupling 32a to provide axial positioning thereof with respect to the shafts. Also the collars 38a and 40a have protrusions 51, 52 respectively which are received in mating depressions 54, 56 of the coupling 32a. Thus, relative turning movement between the coupling 32a and either shaft 28, 30 is prevented. The outer portion or sleeve 49 of the coupling 32a has a substantially cylindrical configuration and thus constitutes a friction drive roller which directly engages the driven wheel 20 of the bicycle.

Referring again to FIG. 1 there is illustrated a manually operable means for drivingly engaging and disengaging the friction drive roller 48 from the front wheel 20 of the bicycle, said means comprising the arms 35 and 37 pivotally mounting the motors 26 and 27 respectively, a lift rod 58 pivotally connected to arm 35 and a lever 60 engaging the free end of the lift rod 58. There is also illustrated switch means 62, with leads therefrom interconnecting a battery 82 and the motors 26 and 27.

Figure 7:
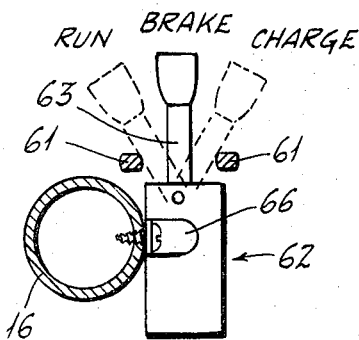
FIG. 7 is a sectional view of the manually operable means and switch means of FIG. 6, taken on the line 7—7 thereof.

The details of the switch means 62 and the manually operable means are best illustrated in FIGS. 6 and 7. The lever 60 is pivotally mounted on the handle bars 16 by means of a bracket 64, and has a fork 61 engaging the switch lever 63. The switch means 62 is also mounted on the handle bars by suitable fastening means 66. The lever 60 is shown in the "engaged" position, with the lift rod 58 under compressive force to thereby cause engagement of the friction drive roller 48 and the bicycle wheel 20. The switch 62 has three positions, and for convenience the positions are designated "run," "brake" and "charge" respectively.

FIG. 5 is a schematic circuit diagram of the attachment of the present invention, showing the battery 82, switch 62 and motors 26 and 27, the latter having permanent magnet fields 81 and 83 respectively. The motors 26 and 27 each have a pair of terminals 68, 72 and 76, 80, and armature brushes 70, 74 and 78, 82 respectively. The terminals and armature brushes of each motor constitute a motor circuit, as referred to in the appended claims. It is to be noted that the terminals of the motors are polarized, and that in permanent magnet field motors of this type, reversing the polarity of the applied voltage will cause a reversal in the direction of rotation of the shaft.

The operation of the drive attachment may now be readily understood. Referring to FIGS. 1 and 5, and assuming the operator desires the assistance of the power drive (as in the case where the bicycle is being ridden uphill) the operator merely simultaneously shifts the lever 60 to the "engaged" position, (shown in solid lines in FIG. 6) and positions the switch 62 to the forward or "run" position. The left rod 58 acts in a downward direction to cause the motors 26 and 27 and coupling 32 to pivot downward, whereby the friction drive roller 48 is swung into engagement with the front wheel 20 of the bicycle. From FIG. 5 it can be seen that, with switch 62 in the "run" position and with switch 88 closed (as is normally the case), motors 26 and 27 have their similarly polarized (+) terminals 68, 76 and minus 72, 80 (−) respectively connected in parallel across battery 82. Thus current is caused to flow from the positive terminal of the battery 82 into terminals 68 and 76 and out from terminals 72, 80 of motors 26 and 27 respectively, and back into the negative terminal of battery 82, whereby the motors will impart power to the drive roller 48 and hence to the front wheel 20, to assist in propelling the bicycle up the hill.

With the bicycle travelling on level ground or downhill, the drive attachment can be left in the "engaged" position, with the switch 62 in the position designated "charge" if it is desired to recharge the battery 82, or in the position "brake" if auxiliary braking is desired. Referring to FIG. 5 it is noted that with switch 62 in the position indicated "charge," terminal 72 of motor 26 is connected through the switch 62 to terminal 76 of motor 27, and terminal 68 of motor 26 is connected (through closed switch 88) to the (+) terminal of battery 82, and terminal 80 of the motor 27 is connected to the (−) of the battery 82. By such arrangement the switch 62 has terminated the parallel connection of the motors across the battery, and has effected a series-aiding connection of the motor terminals across the battery, thus providing a charging current thereto when the motors are mechanically driven at high speed by the front wheel of the bicycle. There is a distinct advantage in employing a pair of motors rather than a single motor, and in connecting the motors in series-aiding relation rather than in parallel across the battery during the charging interval. With such a series connection of a pair of motors, a much lower motor speed (and hence bicycle speed) can still develop an adequate charging voltage as would not be the case if a single motor were employed or if the pair of motors were paralleled. This arises from the fact that the voltage generated by such motors when mechanically driven is almost exactly proportional to motor shaft speed, and that the two voltages developed by the series connected motors are added together and the sum or total applied to the battery to charge it. As a result, by such an arrangement, each of the motors need be driven at roughly only one-half their normal charging speed in order to provide adequate charging voltage to the battery.

Auxiliary braking to the bicycle can be effected by positioning the switch 62 to its "brake" position. Referring again to FIG. 5, it is seen that by such an operation, the motor terminals 68, 76 are connected together (through the switch 62) to one lead of a load resistor 84, and terminals 72, 80 are connected together to the other lead of the resistor 84. By such an arrangement the motors, when mechanically driven, cause a current to flow through the resistor, the flow of said current producing a torque in the motors which opposes the initial driving torque, as is well known in motor technology, and thus provides a braking to the drive roller 48 and hence the front wheel 20 of the bicycle. Such braking can be employed to supplement the conventional braking means provided on the bicycle, if need be.

Referring to FIGS. 6 and 7, the lever 60 and switch lever 63 are so arranged that when the lever 60 is moved to its "disengaged" position, the switch lever 63 is automatically driven to its centermost or "brake" position by the fork 61 of lever 60. This insures that the battery 82 becomes disconnected from the motors when the drive attachment is not in use, thus eliminating the possibility that the battery will become discharged inadvertently during non-use.

Referring to FIGS. 1 and 5, there is illustrated a centrifugal switch means comprising a second (driven) roller 86 which is connected to the switch proper 88 which can be similar in construction to those employed as speed controls in electric kitchen mixers, as is well known in the art.

The driven roller 86 is positioned adjacent the drive roller 48 and is adapted to engage the front wheel 20 simultaneously with the drive roller. In the event that the speed of the bicycle exceeds a predetermined amount, the centrifugal switch 88 in FIG. 5 will be caused to open and thus interrupt the connection between the motors 26 and 27 and the battery 82 in response to rotation of the front wheel 20, at an excessive rate. By such arrangement the maximum speed of the bicycle can be automatically limited to a safe value when the drive roller is in engagement with the bicycle wheel. Thus, the likelihood of serious injury to the rider due to an accident occurring at an abnormally high speed resulting from the use of the power drive attachment is minimized.

FIG. 5 also illustrates a battery charger circuit comprising a plug 90 for connection to commercial power line, a transformer 92, rectifier 94, filter capacitor 96 and current-limiting resistor 98. A switch 100 (normally open during the use of the bicycle) connects the charger circuit to the battery 82. The charger circuit can be sufficiently small and light-weight so as to permit mounting it on the bicycle. Thus, the battery 82 can be conveniently recharged when the bicycle is being stored, simply by connecting the plug 90 to a source of alternating current, and closing switch 100. The switch 62 should preferably be placed in its "brake" position, to thereby disconnect the motors 26 and 27 from the battery 82 during charging. When it is desired to use the bicycle, the switch 100 can simply be opened and the plug 90 removed, such action requiring only several seconds to be completed.

A ring 104 is slidably carried by the handle bars 16 and can be slipped over the end portion of the lever 60 in order to maintain the latter in the "disengaged" position during normal non-powered use of the bicycle.

From the foregoing it can be seen that I have provided a novel and improved bicycle power drive attachment which is simple in construction, efficient in operation and versatile to use. There is a minimum of moving parts in the attachment, and no complex or inefficient linkages or gear trains are employed, thus insuring reliable operation. In addition, the attachment does not disrupt the operation of the bicycle in the conventional mode, and thus provides flexibility and versatility to the user.

Variations and modifications are possible without departing from the spirit of the invention.

I claim:

1. An electric power drive attachment for a wheeled vehicle, comprising in combination:
    a. a pair of separate and distinct electric motors disposed end to end, having shafts arranged in axial alignment with one another,
    b. resilient means disposed between the adjacent ends of the motors for interconnecting the motor shafts for simultaneous turning;
    c. said resilient means further comprising a friction drive roller being drivingly engageable with one wheel of the vehicle.

2. The invention as set forth in claim 1 wherein:
    a. the resilient means comprises a rubber coupling having sockets in its ends in which the motor shafts are received.

3. The invention as set forth in claim 1, and further including:
    a. manually operable means for drivingly engaging and disengaging the friction drive roller and one wheel of the vehicle.

4. The invention as set forth in claim 1, wherein:
    a. said motors are capable of generating a current, each having a permanent magnet field.

5. The invention as set forth in claim 4, wherein:
    a. each of said motors has a pair of terminals and armature brushes connected thereto, constituting a motor circuit,
    b. a battery, and
    c. switch means connected to the terminals of said motors for effecting a parallel connection thereof, across the battery.

6. The invention as set forth in claim 5, wherein:
    a. said battery is of the rechargeable type, and b. said switch means being adapted to terminate said parallel connection of the motor terminals and to effect a series aiding connection of the terminals across the battery to recharge the same when the motors are being mechanically driven at high speed.

7. The invention as set forth in claim 5, wherein:
a. said switch means is adapted to connect said motor terminals across a load resistor, for braking purposes.

8. The invention as set forth in claim 5, and further including:
a. manually operable means for drivingly engaging and disengaging the friction drive roller and one wheel of the vehicle, and
b. said switch means being actuated by the manually operable means to open said motor circuits when said drive roller is disengaged from the vehicle wheel.

9. The invention as set forth in claim 2, wherein:
a. said motor shafts have flatted portions, respectively, and
b. said sockets comprising means keyed to said flatted portions of the shafts to prevent slippage.

10. An electric power drive attachment to a wheeled vehicle, comprising in combination:
a. a pair of separate and distinct electric motors disposed end to end, having their shafts in axial alignment,
b. a friction drive roller disposed between the adjacent ends of the motors and drivingly engageable with one wheel of the vehicle, and
c. resilient means for interconnecting the motor shafts for simultaneous turning, for imparting power to the roller from the motor shafts,
d. said resilient means comprising a rubber coupling having sockets in its ends in which the motor shafts are received,
e. said rubber coupling having a longitudinal bore communicating with said sockets, whereby a clearance space exists between the ends of the shafts.

11. The invention as set forth in claim 10, and further including:
a. a pair of collars carried respectively by said shafts and engaging two end portions respectively of the coupling to provide axial positioning thereof with respect to the shafts.

12. An electric power drive attachment for a wheeled vehicle, comprising in combination:
a. a pair of separate and distinct electric motors disposed end to end, having their shafts in axial alignment,
b. a friction drive roller disposed between the adjacent ends of the motors and drivingly engageable with one wheel of the vehicle,
c. resilient means for interconnecting the motor shafts for simultaneous turning, for imparting power to the roller from the motor shafts, and
d. centrifugal switch means connected to said battery and operative to disconnect the motors therefrom in response to rotation of the wheel of the vehicle at a rate in excess of a predetermined value.

13. The invention as set forth in claim 11, wherein:
a. one of said collars is provided with a protrusion engaging one end of the rubber coupling,
b. said rubber coupling having a depression mating with and receiving said protrusion, whereby relative turning between the coupling and the collar is prevented.

* * * * *